US006992704B2

(12) United States Patent
Nagano et al.

(10) Patent No.: US 6,992,704 B2
(45) Date of Patent: *Jan. 31, 2006

(54) IMAGE PROCESSING APPARATUS AND METHOD, RECORDING MEDIUM, AND PROGRAM

(75) Inventors: Shiho Nagano, Tokyo (JP); Takahiro Ishii, Tokyo (JP); Yasushi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/086,817

(22) Filed: Mar. 21, 2005

(65) Prior Publication Data

US 2005/0162527 A1    Jul. 28, 2005

Related U.S. Application Data

(63) Continuation of application No. 10/121,896, filed on Apr. 11, 2002, now Pat. No. 6,919,922.

(30) Foreign Application Priority Data

Apr. 12, 2001  (JP) .......................... P2001-113985

(51) Int. Cl.
*H04N 5/225* (2006.01)

(52) U.S. Cl. ................................ 348/218.1; 348/221.1

(58) Field of Classification Search ............ 348/218.1, 348/36, 222.1, 39, 252, 241, 42, 207.99; 382/243, 266, 312, 173, 285, 254

See application file for complete search history.

(56) References Cited

U.S. PATENT DOCUMENTS

| 6,275,615 | B1 * | 8/2001 | Ida et al. ..................... 382/173 |
| 2002/0122117 | A1 * | 9/2002 | Nakagawa et al. .......... 348/218 |
| 2002/0176008 | A1 * | 11/2002 | Nagano et al. ........... 348/218.1 |
| 2004/0021775 | A1 * | 2/2004 | Kondo et al. .......... 348/207.99 |
| 2004/0052425 | A1 * | 3/2004 | Kondo et al. ............ 348/222.1 |
| 2004/0095472 | A1 * | 5/2004 | Yoshida et al. ........ 348/208.12 |
| 2004/0189796 | A1 * | 9/2004 | Ho et al. ....................... 348/42 |

* cited by examiner

*Primary Examiner*—Aung Moe
(74) *Attorney, Agent, or Firm*—Bell, Boyd & Lloyd LLC

(57) ABSTRACT

An image processing apparatus, for equally dividing an area of an arbitrary figure by pixel units by a number of parallel lines, which includes an input element for inputting a dividing number for a figure obtaining element which obtains a total number of pixels of the figure, a calculating element for calculating an initial ideal value by dividing the total number of pixels by the dividing number, a computing element for computing an ideal value of the number of pixels of a kth divided region in the figure using the initial ideal value and a sum of determined values of the numbers of pixels of a first to a (k−1)th divided region, and a determining element for determining a determined value of the number of pixels of the kth divided region such that an error between the determined value of the number of pixels of the kth divided region and the ideal value of the number of pixels of the kth divided region is minimized.

3 Claims, 10 Drawing Sheets

$X_1 = X_2 = X_3 = X_4 = X_5 = X_6$ $T_1$: COMPUTING TIME OF THE SYSTEM AS A WHOLE $S_1 = S_2 = S_3 = S_4 = S_5 = S_6$

EXAMPLE OF h = 20, w = 22, N = 4

Sd[1] ≒ Sd[2] ≒ Sd[3] ≒ Sd[4]

IMAGE PROCESSING APPARATUS AND METHOD, RECORDING MEDIUM, AND PROGRAM

CROSS REFERENCE TO RELATED APPLICATIONS

The present application is a continuation of U.S. patent application Ser. No. 10/121,896 filed on Apr. 11, 2002, now U.S. Pat. No. 6,919,922 the disclosure of which is herein incorporated by reference.

BACKGROUND OF THE INVENTION

The present invention relates to an apparatus and a method for image processing, a recording medium, and a program, and particularly to an apparatus and a method for image processing, a recording medium, and a program suitable for use in a case, for example, where the area of an arbitrary figure is divided by pixel units as equally as possible.

As shown in FIG. 1, for example, there are techniques for obtaining a number of pieces of two-dimensional image data by photographing a three-dimensional object from a number of positions on a circumference formed with the three-dimensional object as a center, and performing predetermined processing on the number of pieces of two-dimensional image data using a computer or the like to thereby generate three-dimensional image data of a given region including the three-dimensional object (region represented by a cylinder in FIG. 1 and hereinafter described as a reconstructing region).

The processing for generating the three-dimensional image data using the two-dimensional image data requires an enormous amount of storage of both space and calculation. Hence, when the processing is performed using a single calculator (such as a computer workstation), it takes a long time to obtain the three-dimensional image data as a result of the processing.

Thus, as described in literature such as "Toru Sasaki and Yasushi Fukuda: Reconstruction of Three-Dimensional X-Ray CT Image Using Distributed Memory Type Multi-processor System, Information Processing Society of Japan, pp. 1681, vol. 38, No. 9, September 1997" and "Feldkamp, L. A., Davis, L. C. and Kress, J. W.: Practical Cone-beam Algorithm, Optical Society of America, Vol. 1, pp. 612–619 (1984)," for example, a processing time required to obtain the three-dimensional image data may be reduced by dividing the reconstructing region in a vertical direction by a number of parallel lines, and making a parallel computer (or a number of independent computers) capable of performing a number of different computations simultaneously perform a computation for each of the divided regions.

When the reconstructing region is divided into a number of regions and different computers of the parallel computer are made to perform computations for the divided regions simultaneously, a method of dividing the reconstructing region is an important problem in reducing the processing time required to obtain the three-dimensional image data.

Suppose that the shape of a figure when the reconstructing region is viewed from a given direction is as shown in FIG. 2, for example. FIG. 3 shows an example of division of the reconstructing region. In the case of FIG. 3, the reconstructing region is divided into a number of regions equal to each other in width in a direction of the axis of abscissas (divided into six parts). Computations for the six divided regions $S_1$ to $S_6$ are performed by six computers $P_1$ to $P_6$ that perform parallel operation. In this case, as is clear from FIG. 3, areas of the regions $S_1$ to $S_6$ differ greatly from each other and, therefore, the computers $P_1$ to $P_6$ each have a different processing time (computation time), as shown in FIG. 4. Hence, the longest processing time, or the processing time of the computer $P_6$ is a real processing time $T_1$ of the computers $P_1$ to $P_6$ as a whole.

Next, FIG. 5 shows another example of division of the reconstructing region. In the case of FIG. 5, the reconstructing region is divided in a direction of the axis of abscissas (divided into six parts) such that areas of regions after the division are equal to each other. Computations for the six divided regions $S_1$ to $S_6$ are performed by six computers $P_1$ to $P_6$ that perform parallel operation. In this case, the areas of the regions $S_1$ to $S_6$ are equal to each other and, therefore, the processing times of the computers $P_1$ to $P_6$ are also equal to each other, as shown in FIG. 6. Hence, a real processing time $T_2$ of the computers $P_1$ to $P_6$ as a whole is shorter than the real processing time $T_1$ of the computers $P_1$ to $P_6$ as a whole in the case of FIG. 3.

It is easy to geometrically divide an arbitrary figure in the direction of the axis of abscissas such that areas of regions after the division are equal to each other, as shown in FIG. 5. In practice, however, image data of the reconstructing region is formed by pixel units. A dividing boundary line is therefore limited to a position between pixels; in other words, the division needs to be made by pixel units. However, it is difficult to divide an arbitrary figure by pixel units in the direction of the axis of abscissas such that areas after the division are equal to each other, and no techniques for this have been established.

SUMMARY OF THE INVENTION

It is an object of the present invention to make it possible to divide an arbitrary figure by pixel units in a given direction such that areas after the division are as equal to each other as possible.

According to the present invention, there is provided an image processing apparatus which includes: an input element for inputting a dividing number for a figure; an obtaining element for obtaining a total number of pixels of the figure; a calculating element for calculating an initial ideal value by dividing the total number of pixels by the dividing number; a computing element for computing an ideal value of the number of pixels of a kth divided region in the figure using the initial ideal value and a sum of determined values of the numbers of pixels of a first to a (k−1)th divided region; and a determining element for determining a determined value of the number of pixels of the kth divided region such that an error between the determined value of the number of pixels of the kth divided region and the ideal value of the number of pixels of the kth divided region is minimized.

The determining element can determine the determined value of the number of pixels of the kth divided region by adding and subtracting pixels of the figure by a column unit such that the error between the determined value of the number of pixels of the kth divided region and the ideal value of the number of pixels of the kth divided region is minimized.

According to the present invention, there also is provides an image processing method which includes: an input step for inputting a dividing number for a figure; an obtaining step for obtaining a total number of pixels of the figure; a calculating step for calculating an initial ideal value by dividing the total number of pixels by the dividing number;

a computing step for computing an ideal value of the number of pixels of a kth divided region in the figure using the initial ideal value and a sum of determined values of the numbers of pixels of a first to a (k−1)th divided region; and a determining step for determining a determined value of the number of pixels of the kth divided region such that an error between the determined value of the number of pixels of the kth divided region and the ideal value of the number of pixels of the kth divided region is minimized.

The present invention also provides a program on a recording medium which includes: an input step for inputting a dividing number for a figure; an obtaining step for obtaining a total number of pixels of the figure; a calculating step for calculating an initial ideal value by dividing the total number of pixels by the dividing number; a computing step for computing an ideal value of the number of pixels of a kth divided region in the figure using the initial ideal value and a sum of determined values of the numbers of pixels of a first to a (k−1)th divided region; and a determining step for determining a determined value of the number of pixels of the kth divided region such that an error between the determined value of the number of pixels of the kth divided region and the ideal value of the number of pixels of the kth divided region is minimized.

Moreover, the present invention provides a program executed by a computer which includes: an input step for inputting a dividing number for a figure; an obtaining step for obtaining a total number of pixels of the figure; a calculating step for calculating an initial ideal value by dividing the total number of pixels by the dividing number; a computing step for computing an ideal value of the number of pixels of a kth divided region in the figure using the initial ideal value and a sum of determined values of the numbers of pixels of a first to a (k−1)th divided region; and a determining step for determining a determined value of the number of pixels of the kth divided region such that an error between the determined value of the number of pixels of the kth divided region and the ideal value of the number of pixels of the kth divided region is minimized.

The image processing apparatus and method and the program according to the present invention input a dividing number for a figure, obtain a total number of pixels of the figure, and calculate an initial ideal value by dividing the total number of pixels by the dividing number. Further, the image processing apparatus and method and the program according to the present invention compute an ideal value of the number of pixels of a kth divided region in the figure using the initial ideal value and a sum of determined values of the numbers of pixels of a first to a (k−1)th divided region, and determine a determined value of the number of pixels of the kth divided region such that an error between the determined value of the number of pixels of the kth divided region and the ideal value of the number of pixels of the kth divided region is minimized.

Additional features and advantages of the present invention are described in, and will be apparent from, the following Detailed Description of the Invention and the Figures.

DETAILED DESCRIPTION OF THE INVENTION

Figure 7:
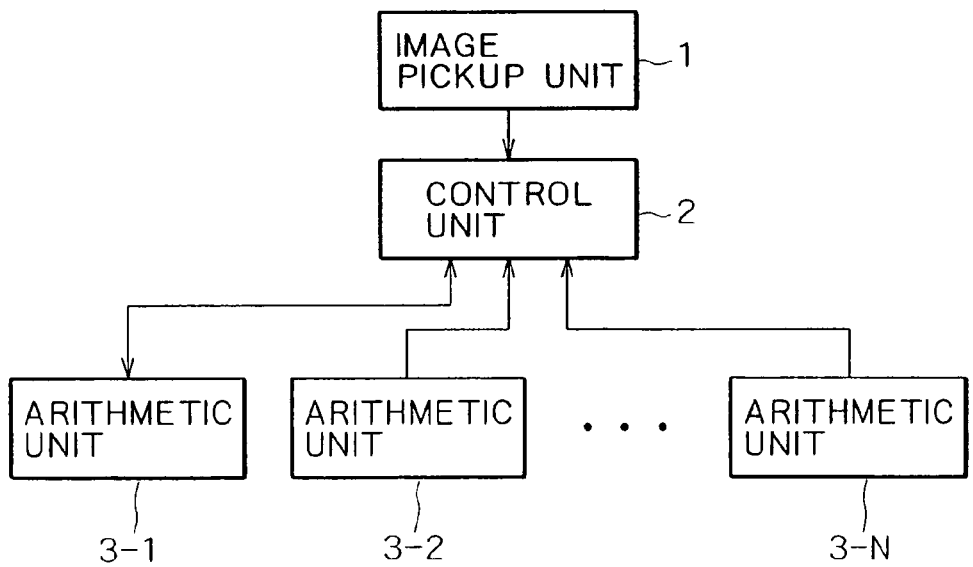
FIG. 7 is a block diagram showing an example of a configuration of a three-dimensional image data generating system.

An example of a configuration of a three-dimensional image data generating system to which the present invention is applied will be described with reference to FIG. 7.

An image pickup unit 1 obtains a number of pieces of two-dimensional image data by photographing a three-dimensional object from a number of positions on a circumference formed with the three-dimensional object as a center. The image pickup unit 1 then outputs the pieces of two-dimensional image data to a control unit 2. The control unit 2 supplies the number of pieces of two-dimensional image data inputted from the image pickup unit 1 to arithmetic units 3-1 to 3-N. Also, the control unit 2 divides a shape when a reconstructing region is viewed from a given direction by pixel units as equally as possible by a number of straight lines parallel to each other, and assigns arithmetic processing on divided regions to the arithmetic units 3-1 to 3-N. In addition, the control unit 2 integrates arithmetic results supplied from the arithmetic units 3-1 to 3-N (hereinafter described simply as the arithmetic unit 3 when the arithmetic units 3-1 to 3-N do not need to be distinguished individually) to thereby generate three-dimensional image data of the reconstructing region. The arithmetic unit 3 performs the arithmetic processing assigned by the control unit 2, and then outputs the result to the control unit 2.

Figure 8:
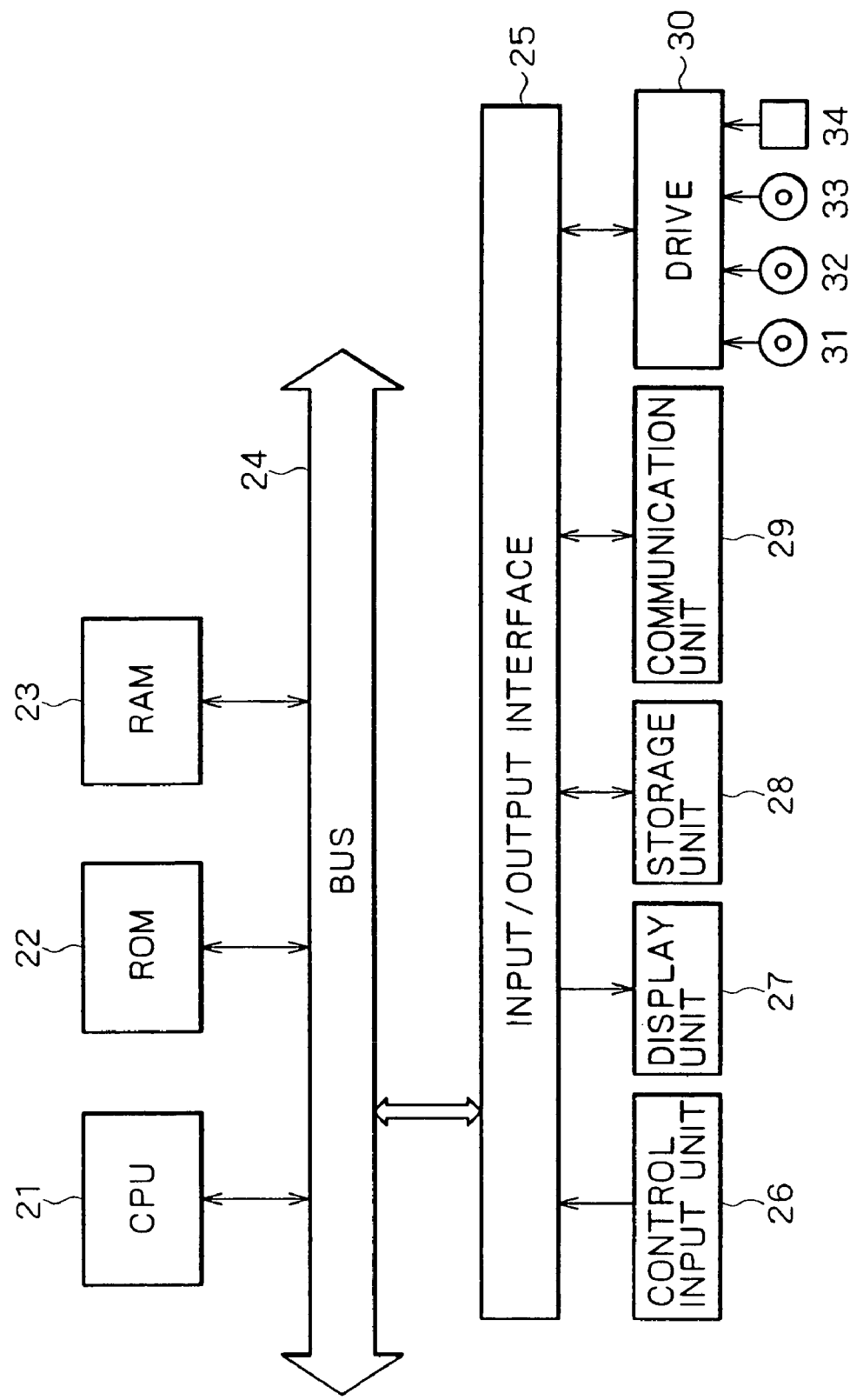
FIG. 8 is a block diagram showing an example of a configuration of an information processing apparatus as a control unit.

FIG. 8 shows an example of configuration of an information processing apparatus such as a workstation that functions as the control unit 2 by executing a predetermined program.

The information processing apparatus includes a CPU (Central Processing Unit) 21. The CPU 21 is connected with an input/output interface 25 via a bus 24. The input/output interface 25 is connected with: a control input unit 26 formed by input devices such as a keyboard and a mouse for the user to input a control command; a display unit 27 formed by a CRT (Cathode Ray Tube), an LCD (Liquid Crystal Display) or the like for displaying a result of processing, etc.; a storage unit 28 formed by a hard disk drive or the like for storing programs and various data; a communication unit 29 for communicating data via a network such as the Internet; and a drive 30 for reading and writing data from and to a recording medium such as a magnetic disk 31 to a semiconductor memory 34. The bus 24 is connected with a ROM (Read Only Memory) 22 and a RAM (Random Access Memory) 23.

The program that allows the information processing apparatus to perform operation as the control unit 2 is supplied to the information processing apparatus in a state of being stored on the magnetic disk 31 (including a floppy disk), the optical disk 32 (including CD-ROM (Compact Disc-Read Only Memory) and DVD (Digital Versatile Disc)), the magneto-optical disk 33 (including MD (Mini Disc)), or the semiconductor memory 34, is read by the drive 30, and is installed on the hard disk drive included in the storage unit 28. The program installed in the storage unit 28 is loaded from the storage unit 28 into the RAM 23 and then executed by a command of the CPU 21 corresponding to an operation by the user inputted to the control input unit 26.

The arithmetic unit 3 also can take the form of an information processing apparatus having, for example, a configuration as shown in FIG. 8 which executes a predetermined program. The arithmetic unit 3, or information processing apparatus, also might have a number of CPUs to further divide the arithmetic processing assigned by the control unit 2 and then simultaneously perform the divided arithmetic processing.

Figure 9:
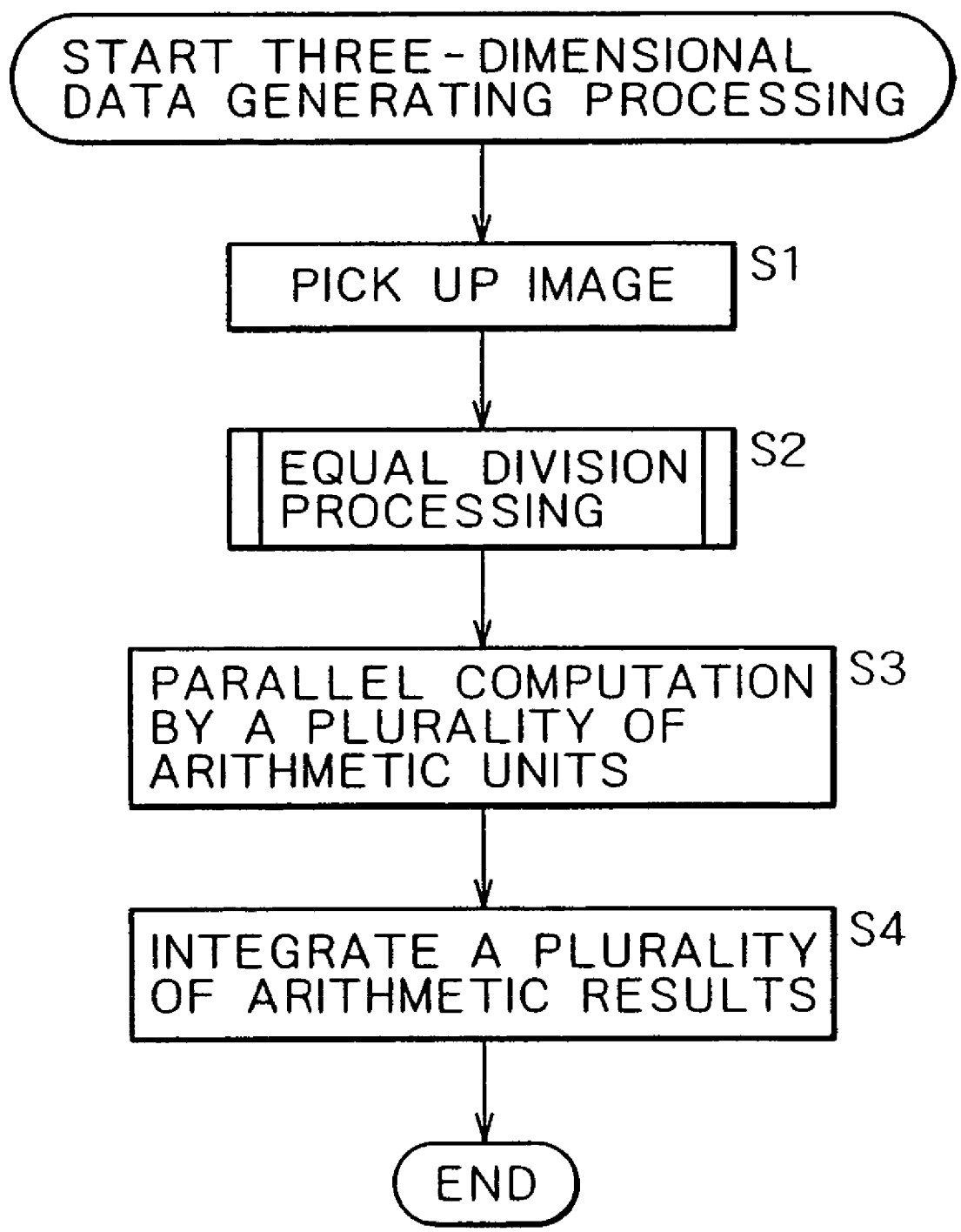
FIG. 9 is a flowchart to assist in explaining three-dimensional image data generating processing of the three-dimensional image data generating system.

Operation of the three-dimensional image data generating system will next be described with reference to a flowchart of FIG. 9.

At a step S1, the image pickup unit 1 photographs a three-dimensional object from a number of positions on a circumference formed with the three-dimensional object as a center. The image pickup unit 1 then outputs a number of pieces of two-dimensional image data obtained to the control unit 2.

At a step S2, the control unit 2 supplies the number of pieces of two-dimensional image data inputted from the image pickup unit 1 to the arithmetic units 3-1 to 3-N, and the control unit 2 divides a shape when a reconstructing region is viewed from a given direction (hereinafter described as a target region) by pixel units as equally as possible by a number of straight lines parallel to each other, and assigns arithmetic processing on divided regions to the arithmetic units 3-1 to 3-N. Incidentally, the processing of dividing the target region by pixel units as equally as possible by a number of straight lines parallel to each other (hereinafter described as equal division processing) will be described later with reference to FIG. 10.

At a step S3, the arithmetic unit 3 performs the arithmetic processing assigned by the control unit 2, and then outputs the result to the control unit 2. At a step S4, the control unit 2 integrates arithmetic results supplied from the arithmetic units 3-1 to 3-N to thereby generate three-dimensional image data of the reconstructing region.

Figure 1:
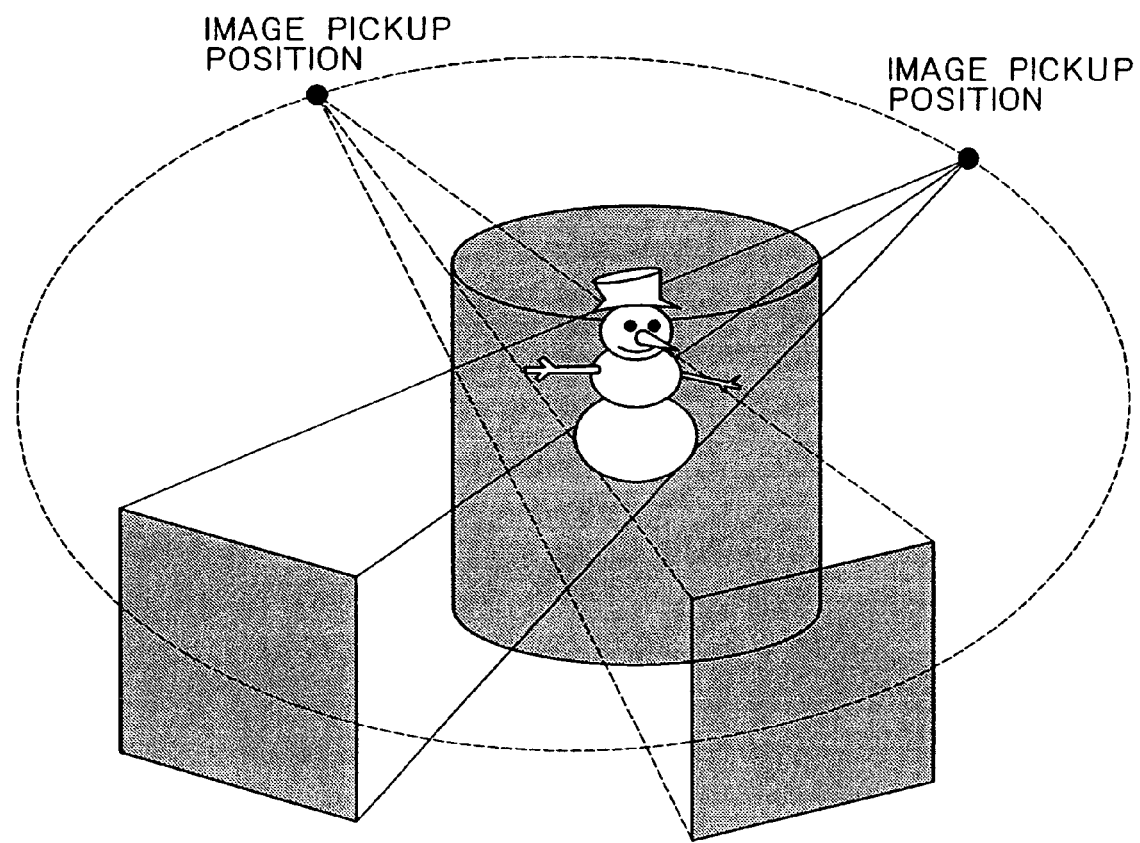
FIG. 1 is a diagram to assist in explaining a conventional technique for generating three-dimensional image data of a reconstructing region using two-dimensional image data.
Figure 2:
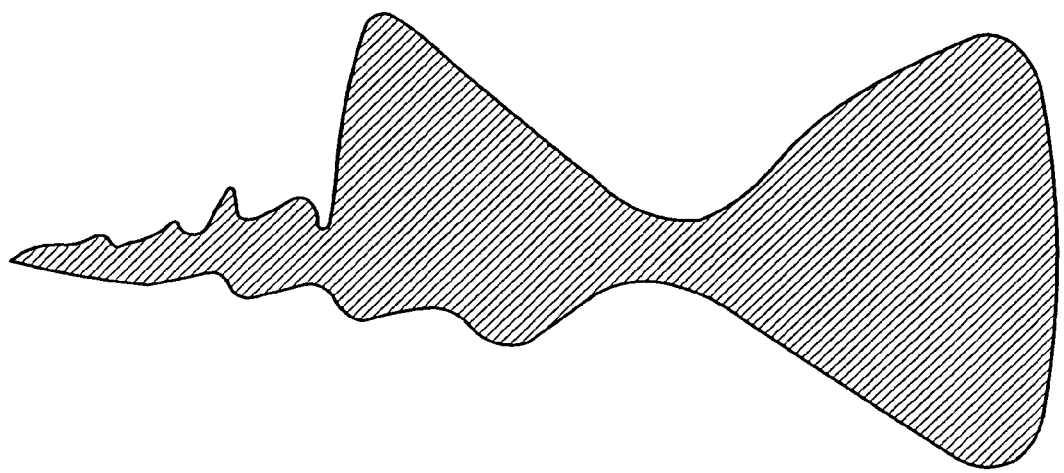
FIG. 2 is a diagram showing an example of the shape of a target region.
Figure 3:
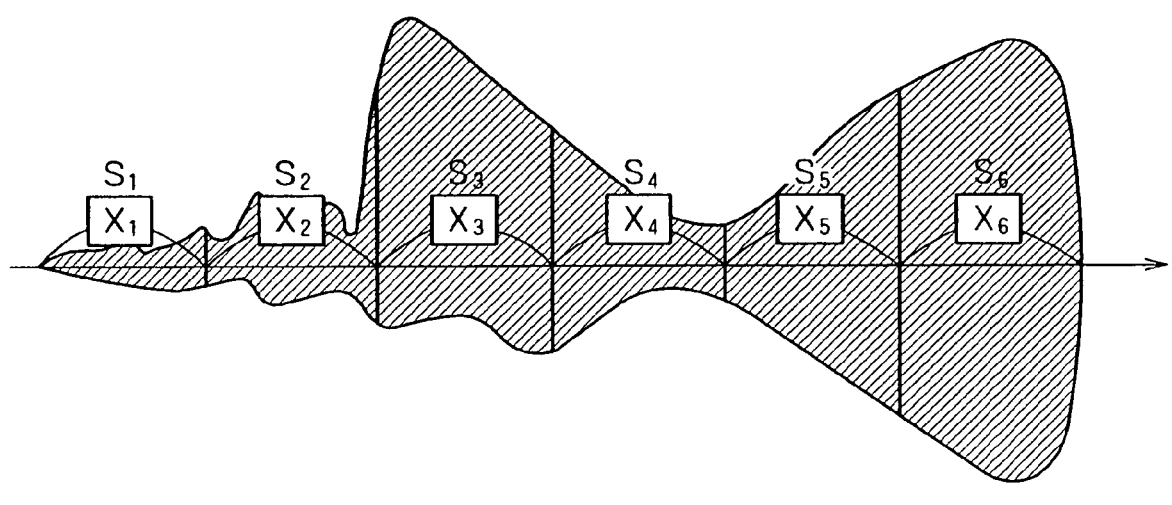
FIG. 3 is a diagram showing an example of dividing the target region into parts equal to each other in width.
Figure 4:
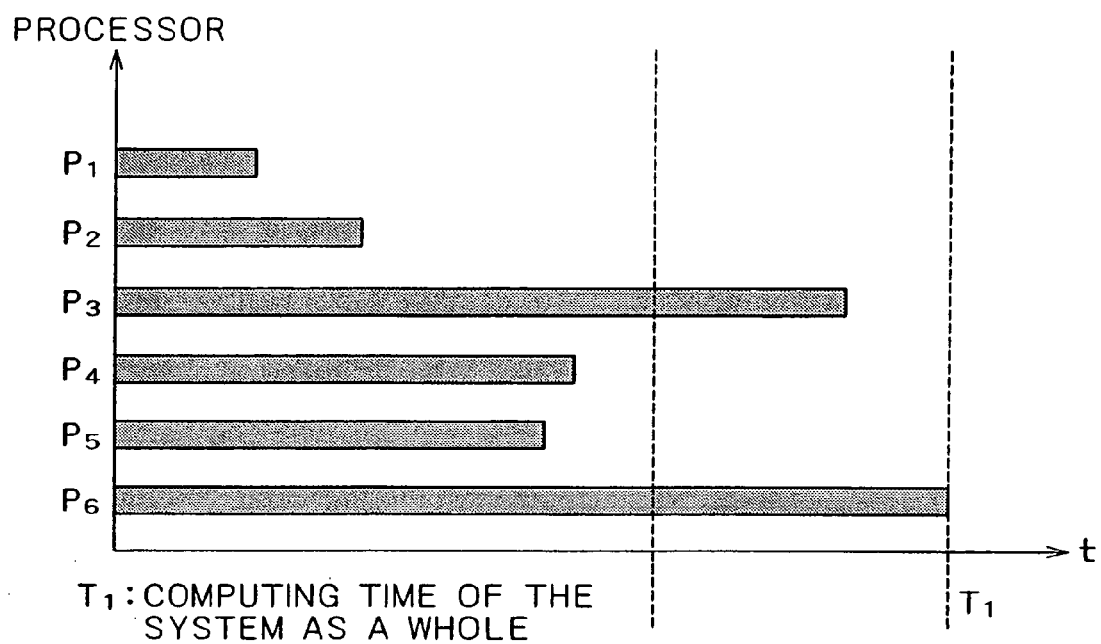
FIG. 4 is a diagram to assist in explaining processing time when the target region is divided into parts equal to each other in width.
Figure 5:
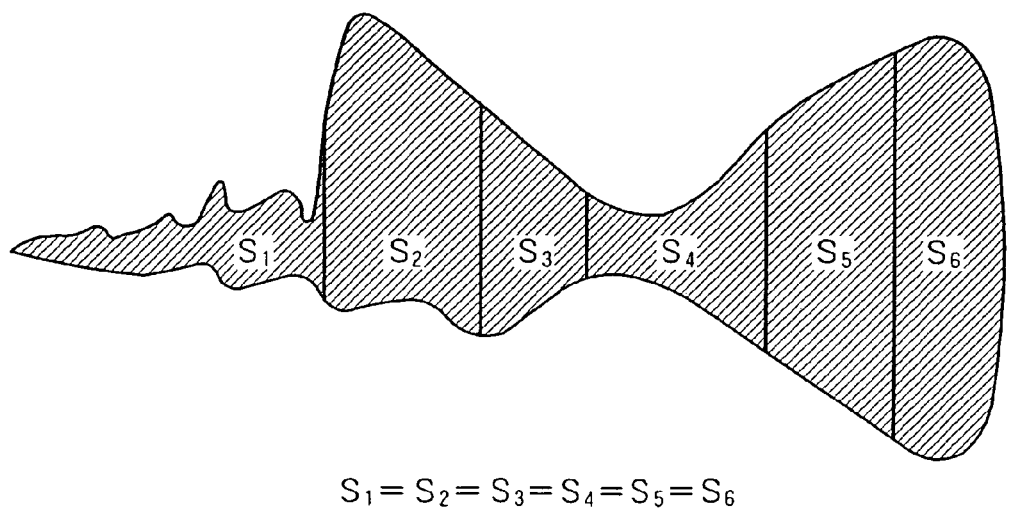
FIG. 5 is a diagram showing an example of dividing the target region into parts equal to each other in area.
Figure 6:
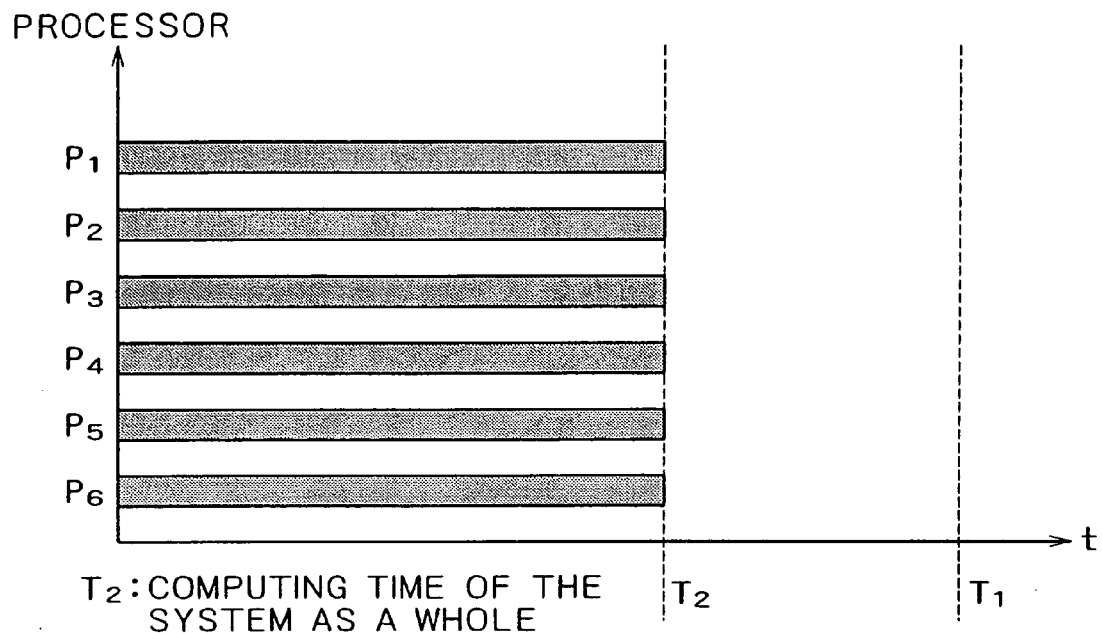
FIG. 6 is a diagram to assist in explaining processing time when the target region is divided into parts equal to each other in area.
Figure 10:
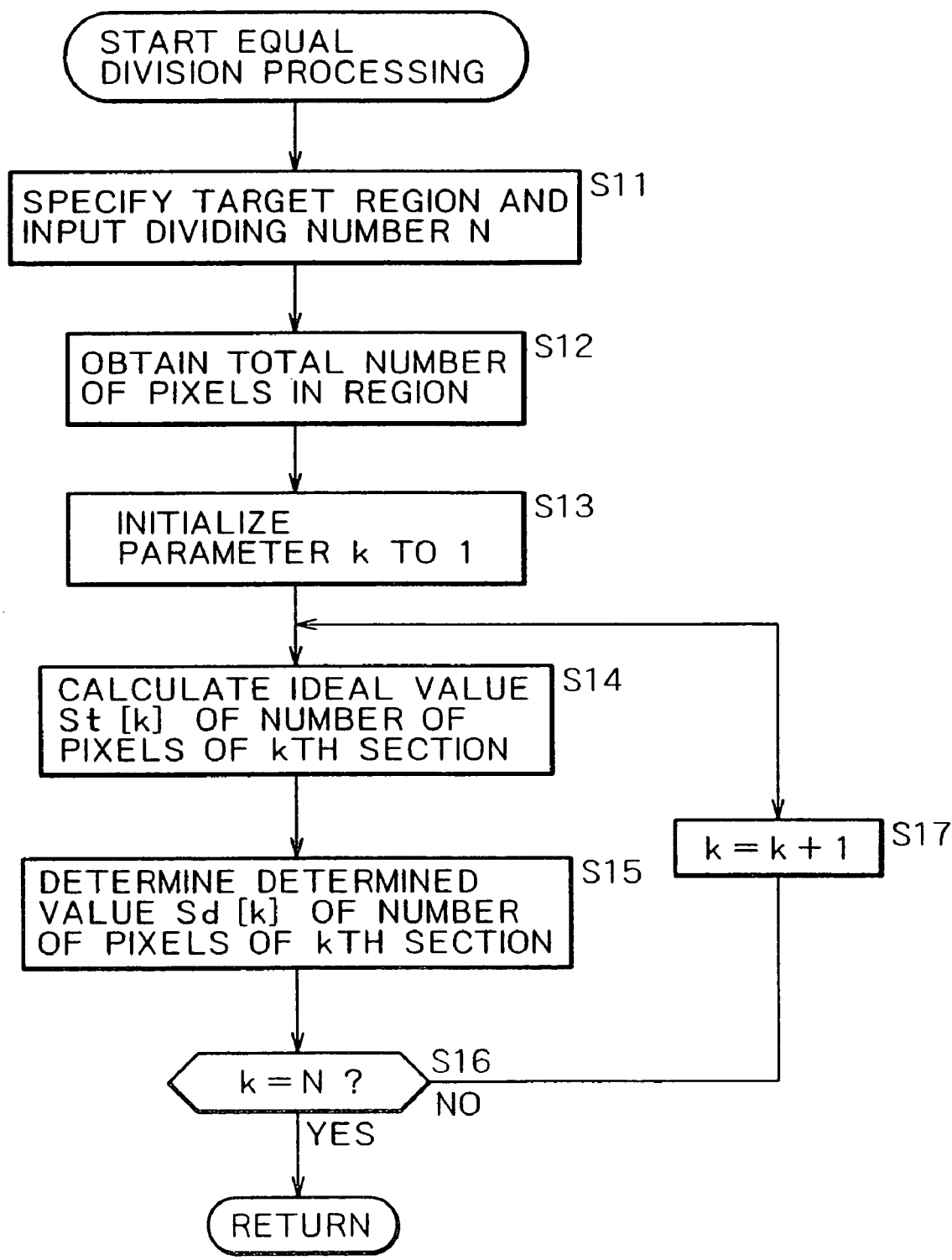
FIG. 10 is a flowchart to assist in explaining equal division processing of the control unit at a step S2.

The division processing by the control unit 2 at the step S2 next will be described with reference to a flowchart of FIG. 10. In the following, a case in which the reconstructing region is of a cylindrical shape as shown in FIG. 1 and the target region to be divided is of a circular shape will be described as an example.

Figure 11:
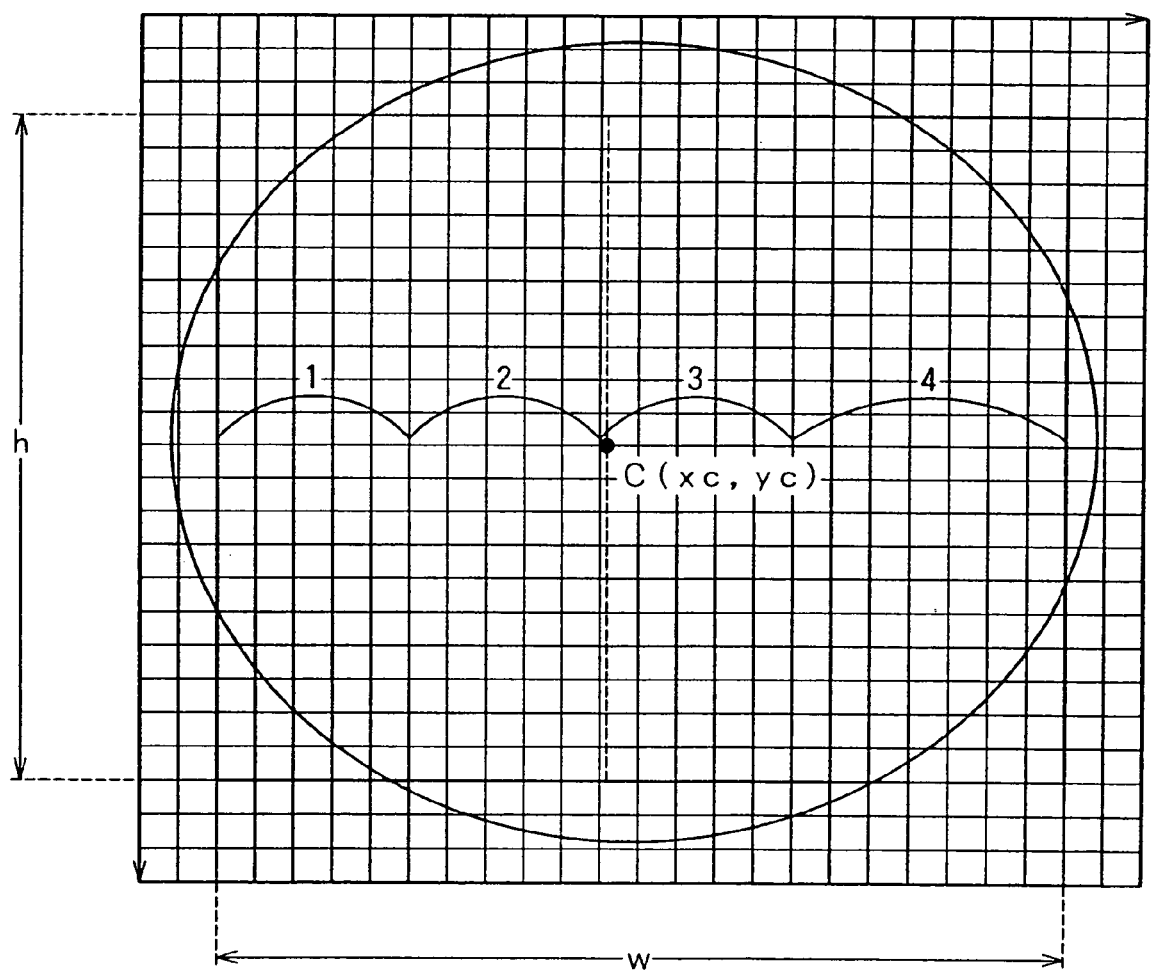
FIG. 11 is a diagram to assist in explaining a method of specifying a target region.

At a step S11, the control unit 2 receives an operation from the user specifying the target region to be divided and the dividing number N. In the method of specifying the target region, when the target region is of a circular shape as in the present case, coordinates (xc, yc) of a center C and a radius r of the target region are specified, as shown in FIG. 11. Depending on the shape of the target region, a vertical width h and a horizontal width w may be specified.

Figure 12:
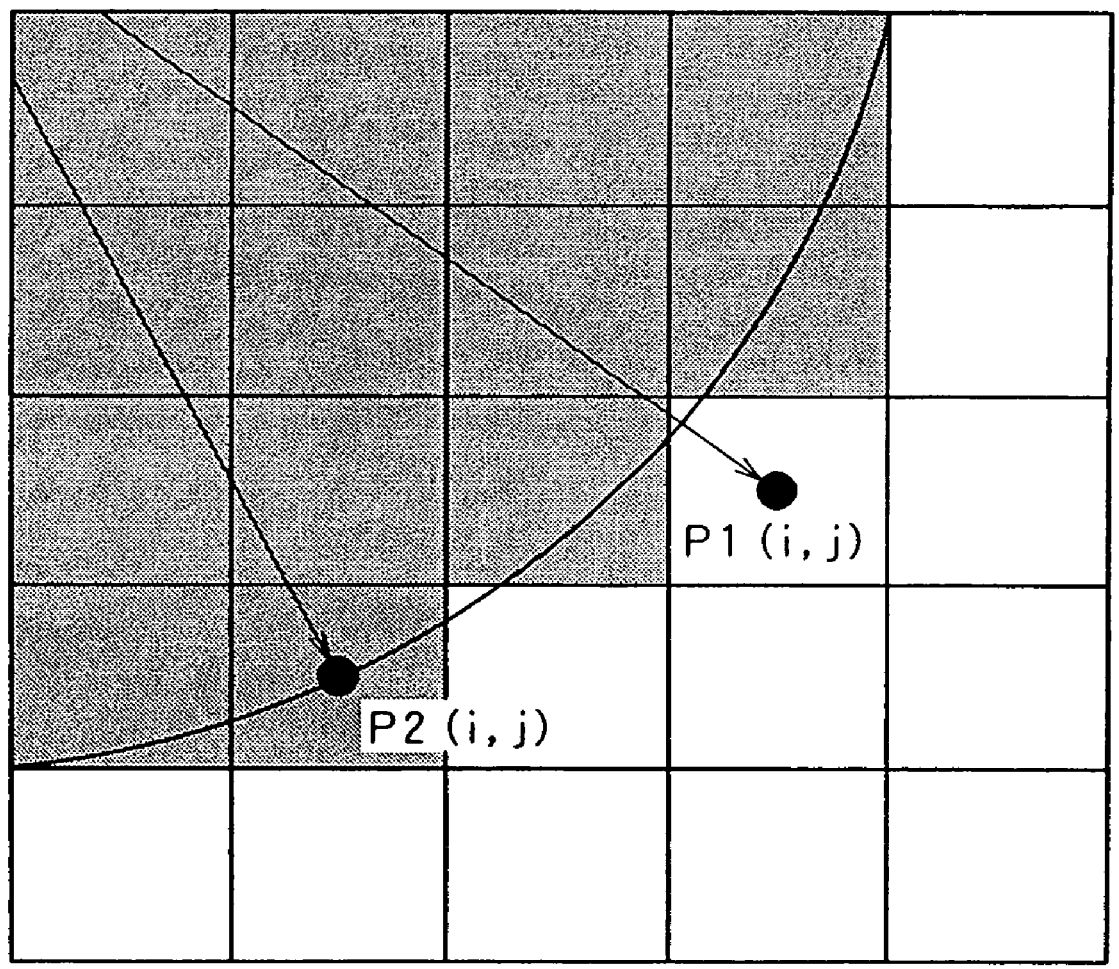
FIG. 12 is a diagram to assist in explaining a method of determining whether or not a pixel is included in the target region.

At a step S12, the control unit 2 obtains a total number Total of pixels constituting the target region by determining whether or not each of all pixels of an area containing the target region is situated in the target region. When the target region is of a circular shape as in the present case, the following equation (1) is applied to each of all the pixels of the area containing the target region to calculate a distance CP between the center C (xc, yc) of the circle forming the target region and coordinates P (i, j) of a center of the pixel. It is determined that a pixel having a distance CP equal to or less than the radius r of the target region (pixel P2 in FIG. 13) is a pixel forming the target region, as shown in FIG. 12. It is determined that a pixel having a distance CP more than the radius r of the target region (pixel P1 in FIG. 13) is a pixel not forming the target region.

$$CP = ((xc-i)^2 + (yc-j)^2)r \quad (1)$$

Incidentally, the processing for obtaining the total number Total of pixels is speeded up by applying the equation (1) to each pixel column in a vertical direction rather than applying the equation (1) randomly tracing all the pixels of the area containing the target region.

In addition, when the target region is of a shape symmetrical with respect to a point or symmetrical with respect to a line, such as a circular shape, a time required for the processing for obtaining the total number Total of pixels is reduced by obtaining the number of pixels constituting a sector that is 1/n of the circle and multiplying the value by n, rather than obtaining the number of pixels constituting the whole of the target region, or the circle.

Then, the control unit 2 divides the total number Total of pixels by the dividing number N to determine an ideal initial value St[0].

$$St[0] = Total/N \quad (2)$$

At a step S13, the control unit 2 initializes a parameter k to 1.

At a step S14, as expressed by the following equation (3), the control unit 2 calculates an ideal value St[k] of the number of pixels of a kth divided region $S_k$ (hereinafter described as a section) in the target region divided by N by adding to the ideal initial value St[0] an error between an ideal value (k−1) Total/N up to a (k−1)th section and a sum ΣSd of a determined value Sd[1] of the number of pixels of a first section $S_1$ to a determined value Sd[k−1] of the number of pixels of the (k−1)th section $S_{k-1}$. The determined value Sd[ ] is determined at a step S15.

$$St[k] = St[0] + [(k-1) \, Total/N - \Sigma Sd] \quad (3)$$
$$= St[0] + [(k-1) \, Total/N - (Sd[1] + \ldots + Sd[k-1])]$$

It is to be noted that an ideal value St[1] of the first divided section $S_1$ is the initial ideal value St[0].

$$St[1] = St[0]$$

According to the equation (3), an ideal value St[2] of a second divided section $S_2$, for example, is:

$$St[2] = St[0] + [Total/N - Sd[1]]$$

According to the equation (3), an ideal value St[3] of a third divided section $S_3$, for example, is:

$$St[3] = St[0] + [2 \, Total/N - (Sd[1] + Sd[2])]$$

At the step S15, the control unit 2 determines the determined value Sd[k] of the number of pixels of the kth section $S_k$ on the basis of the ideal value St[k] of the number of pixels of the kth section $S_k$.

This will be described more specifically. In the following, a total number of pixels of a first column from the left to an ith column in the kth section $S_k$ will be described as S[k][i], wherein the parameter i denotes a column number in the section $S_k$. The control unit 2 determines the value of the parameter i that satisfies the following equation (4).

Specifically, the control unit 2 determines the value of the parameter i while incrementing the parameter i by one so that the total number S[k][i−1] of pixels of the first column to the (i−1)th column in the kth section $S_k$ is smaller than the ideal value St[k] of the number of pixels of the kth section $S_k$, and the total number S[k][i] of pixels of the first column to the ith column in the kth section $S_k$ is equal to or larger than the ideal value St[k] of the number of pixels of the kth section $S_k$. The value of the parameter i that satisfies the equation (4) is assumed to be i'.

$$S[k][i-1] \leq St[k]\ S[k][i] \quad (4)$$

Next, the control unit 2 compares an error |S[k][i']−St[k]|=Δi' between the total number S[k][i'] of pixels of the first column to the i'th column in the kth section $S_k$ and the ideal value St[k] of the number of pixels of the kth section $S_k$ with an error |S[k][i'−1]−St[k]|=Δ(i'−1) between the total number S[k][i'−1] of pixels of the first column to the (i'−1)th column in the kth section $S_k$ and the ideal value St[k] of the number of pixels of the kth section $S_k$.

When Δi' is equal to or more than Δ(i'−1), the control unit 2 determines the total number S[k][i'] of pixels of the first column to the i'th column in the kth section $S_k$ as the determined value Sd[k] of the number of pixels of the kth section $S_k$. When Δi' is less than Δ(i'−1), the control unit 2 determines the total number S[k][i'−1] of pixels of the first column to the (i'−1)th column in the kth section $S_k$ as the determined value Sd[k] of the number of pixels of the kth section $S_k$.

When k=N, however, the determined value Sd[N] of the number of pixels of the last section $S_N$ is a value obtained by subtracting a sum ΣSd=(Sd[1]+ . . . +Sd[N−1]) of determined values of the numbers of pixels of the first to (N−1)th sections from the total number Total of pixels, as expressed by the following equation (5).

$$Sd[N] = \text{Total} - \Sigma Sd \quad (5)$$

At a step S16, the control unit 2 determines whether the parameter k is the dividing number N. When the control unit 2 determines that the parameter k is not the dividing number N, the processing proceeds to a step S17. At the step S17, the control unit 2 increments the parameter k by one. The processing then returns to the step S14 to repeat the processing steps from the step S14 on down. When the control unit 2 thereafter determines at the step S16 that the parameter k is the dividing number N, the processing returns to the step S3 in FIG. 9.

Figure 13:
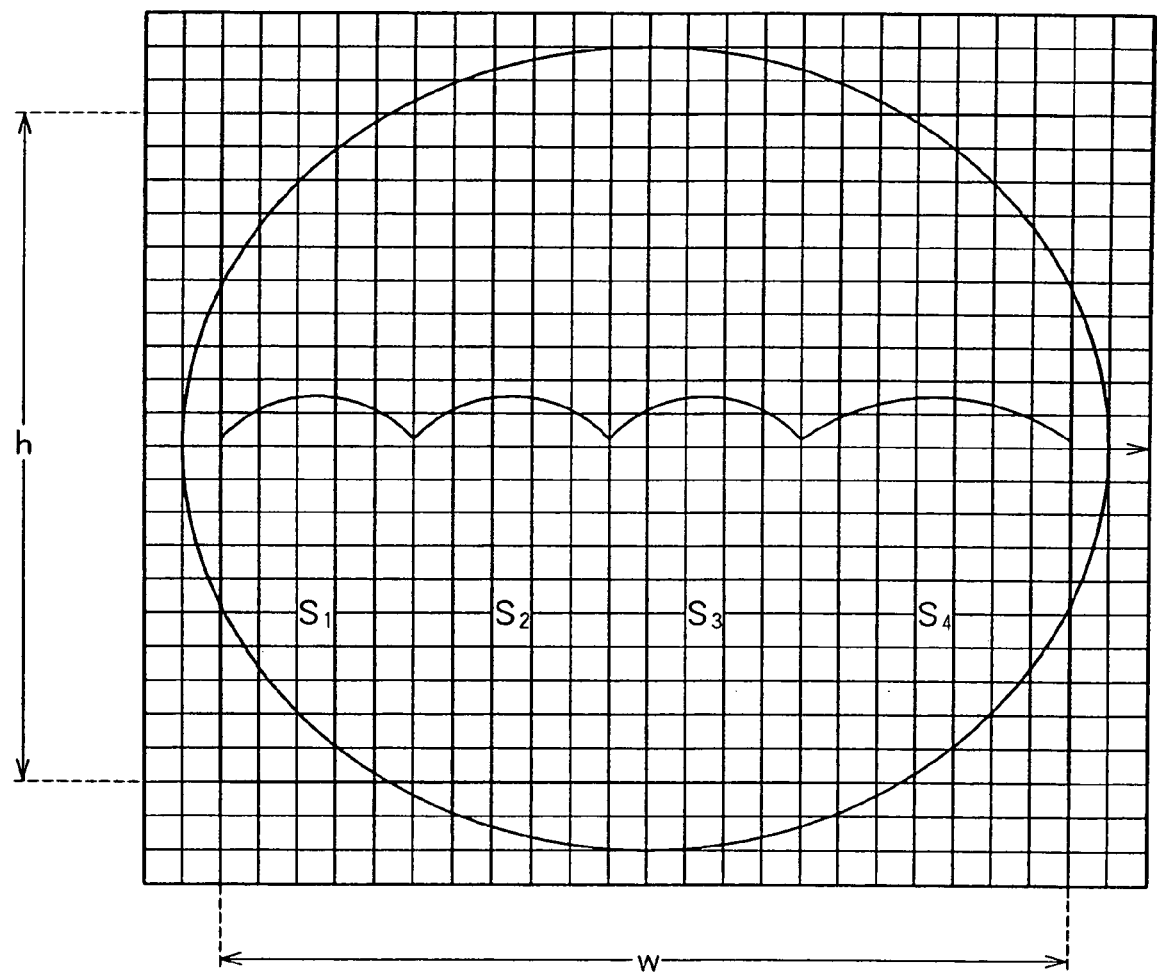
FIG. 13 is a diagram to assist in explaining a result of the equal division processing.

As described above, according to the equal division processing, a situation in which only the determined value Sd[N] of the number of pixels of the last section SN differs greatly from the ideal initial value St[0] will not arise, for example, and as shown in FIG. 13, the determined values Sd[1] to Sd[N] (N=4 in the present case) of the numbers of pixels of the first section $S_1$ to the Nth section $S_N$ are substantially equal to each other. Therefore, computing loads on the arithmetic units 3-1 to 3-N can be made substantially equal to each other. It is, accordingly, possible to reduce computing time of the system as a whole.

It is to be noted that while the equal division processing that makes the division in only a direction of the axis of ordinates has been described above, an arbitrary target region can be divided equally in directions of multiple axes when the target region is divided in a direction of the axis of ordinates and then divided in a direction of the axis of abscissas, for example.

In addition, the present invention is applicable not only to a case in which a two-dimensional target region is divided but also to a case in which a three- or more-dimensional target region is divided.

It is to be noted that in the present specification, the steps describing the program recorded on a recording medium include not only processing steps carried out in time series in the described order, but also processing steps carried out in parallel or individually and not necessarily in time series.

Furthermore, in the present specification, the system represents the entire apparatus formed by a number of units.

As described above, the image processing apparatus and method and the program according to the present invention calculate an ideal value of the number of pixels of a kth divided region in a figure using an initial ideal value and a sum of determined values of the numbers of pixels of a first to a (k−1)th divided region, and determine a determined value of the number of pixels of the kth divided region such that an error between the determined value of the number of pixels of the kth divided region and the ideal value of the number of pixels of the kth divided region is minimized. It is therefore possible to divide an arbitrary figure by pixel units in a certain direction such that areas after the division are as equal to each other as possible.

Although the present invention has been described with reference to specific embodiments, those of skill in the art will recognize that changes may be made thereto without departing from the spirit and scope of the present invention without departing from the hereafter appended claims.

The invention claimed is:

1. A recording medium on which a computer readable program for image processing for equally dividing an area of an arbitrary figure by pixel units by a plurality of parallel lines is recorded, comprising:

an input step for inputting a dividing number for the figure;

an obtaining step for obtaining a total number of pixels of the figure;

a calculating step for calculating an initial ideal value by dividing the total number of pixels by the dividing number;

a computing step for computing an ideal value of the number of pixels of a kth divided region in the figure using the initial ideal value and a sum of determined values of the numbers of pixels of a first to a (k−1)th divided region;

a determining step for determining a determined value of the number of pixels of the kth divided region such that an error between the determined value of the number of pixels of the kth divided region and an ideal value of the number of pixels of the kth divided region is minimized; and a parallel computing step for computing an arithmetic result by an arithmetic unit wherein the arithmetic result is integrated to generate three-dimensional image data.

2. A recording medium as claimed in claim 1, wherein the determining step determines the determined value of the number of pixels of the kth divided region by adding and subtracting pixels of the figure by a column unit such that an error between the determined value of the number of pixels of the kth divided region and the ideal value of the number of pixels of the kth divided region is minimized.

3. A recording medium as claimed in claim 1, wherein the arbitrary figure is a two-dimensional figure.

* * * * *